United States Patent
Thyroff et al.

(10) Patent No.: US 7,507,488 B2
(45) Date of Patent: Mar. 24, 2009

(54) SYSTEM AND METHOD FOR DRYING A FUEL CELL STACK AT SYSTEM SHUTDOWN

(75) Inventors: Jurgen Thyroff, Harxheim (DE); Thomas Weispfenning, Ober-Ramstadt (DE)

(73) Assignee: General Motors Corporation, Detroit, MI (US)

( * ) Notice: Subject to any disclaimer, the term of this patent is extended or adjusted under 35 U.S.C. 154(b) by 816 days.

(21) Appl. No.: 10/987,132

(22) Filed: Nov. 12, 2004

(65) Prior Publication Data

US 2006/0105209 A1    May 18, 2006

(51) Int. Cl.
*H01M 8/04* (2006.01)
(52) U.S. Cl. .............................. 429/13; 429/24; 429/26
(58) Field of Classification Search .................. 429/13, 429/22, 24, 26
See application file for complete search history.

(56) References Cited

U.S. PATENT DOCUMENTS

| | | | | |
|---|---|---|---|---|
| 5,837,393 | A * | 11/1998 | Okamoto | 429/20 |
| 6,268,074 | B1 * | 7/2001 | Siepierski et al. | 429/13 |
| 6,586,123 | B1 * | 7/2003 | Yi et al. | 429/13 |
| 2003/0186093 | A1 * | 10/2003 | St-Pierre et al. | 429/13 |

* cited by examiner

*Primary Examiner*—Stephen J. Kalafut

(57) ABSTRACT

A system and method for drying a fuel cell stack after stack shutdown. In one embodiment, a cooling fluid is pumped through the fuel cell stack after the system is shutdown to use the heat still available in the cooling fluid immediately after shutdown to provide thermal equilibrium in the stack. In another embodiment, the heated cooling fluid still available immediately after system shutdown is sent through a cathode input gas heat exchanger so that drying air from the system compressor is heated by the cooling fluid before it enters the stack. In another embodiment, a separate heat exchanger is provided that receives the drying gas prior to it being sent into the fuel cell stack.

12 Claims, 2 Drawing Sheets

SYSTEM AND METHOD FOR DRYING A FUEL CELL STACK AT SYSTEM SHUTDOWN

BACKGROUND OF THE INVENTION

1. Field of the Invention

This invention relates generally to a system and method for drying a fuel cell stack after stack shutdown and, more particularly, to a system and method for drying a fuel cell stack after stack shutdown, where the system and method includes using a stack coolant flow to maintain a thermal equilibrium within the stack, using a cathode inlet air heat exchanger to heat the cathode air used for drying the fuel cell stack, or using a heat exchanger for heating the cathode air used for drying the fuel cell stack.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. For example, a typical fuel cell stack for a vehicle may have two hundred stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the respective MEA. Cathode gas flow channels are provided on the cathode side of the bipolar plates that allow the cathode gas to flow to the respective MEA. The bipolar plates are made of a conductive material, such as stainless steel, so that they conduct the electricity generated by the fuel cells out of the stack. The bipolar plates also include flow channels through which a cooling fluid flows.

FIG. 1 is a simplified plan view of a fuel cell system 10 including a fuel cell 12 that is one fuel cell in a fuel cell stack. The fuel cell 12 includes an MEA 16, a bipolar plate 14 on the anode side of the MEA 16 and a bipolar plate 18 on the cathode side of the MEA 16. The MEA 16 includes a membrane, such as a PEM, on which a catalyst is deposited so that a catalyst layer of the MEA 16 faces the anode side bipolar plate 14 and a catalyst layer of the MEA 16 faces the cathode side bipolar plate 18. An anode diffusion media layer is positioned in contact with the anode side of the MEA 16 and a cathode diffusion media layer is positioned in contact with the cathode side of the MEA 16. The diffusion media layers are porous layers that provide for gas transport to and water transport from the MEA 16. The other side of the bipolar plate 14 would be the cathode side for one adjacent fuel cell in the fuel cell stack and the other side of the bipolar plate 18 would be the anode side for the other adjacent fuel cell in the fuel cell stack. Also, the bipolar plates 14 and 18 would include cooling fluid flow channels.

An anode flow channel 22 is provided between the MEA 16 and the anode side bipolar plate 14 that receives an anode input gas flow that reacts with the catalyst on the anode side of the MEA 16, as is well understood in the art. Likewise, a cathode channel 24 is provided between the MEA 16 and the cathode side bipolar plate 18 that receives a cathode gas flow that reacts with a catalyst on the cathode side of the MEA 16. The bipolar plates 14 and 18 would be designed to provide a series of parallel spaced apart anode flow channels 22 and cathode channels 24. Suitable manifolds (not shown) would be provided to direct the anode hydrogen gas to the input of the anode flow channels 26 and direct the cathode gas to the input of the cathode flow channels 24, as would be well understood to those skilled in the art.

In this embodiment, the cathode input gas is air provided by a compressor 28 on cathode input line 30. The compressor 28 forces the air through the cathode channels 24 at a desirable pressure and flow rate. Because the cathode input air is sometimes compressed up to three bar during normal stack operation, it may be significantly heated, possibly up to 120° C., by the compression process, which could damage the fuel cell 12. Therefore, the system 10 includes a heat exchanger 32 that reduces the temperature of the cathode input gas using a stack coolant fluid on a flow line 40.

A fuel cell stack will typically be operated between 60°-80° C. to provide the most efficient and optimized stack operating temperature. In order to maintain the fuel cell stack at the desired operating temperature, a thermal sub-system is typically employed that drives a cooling fluid through the cooling flow channels in the bipolar plates 14 and 18. Particularly, the system 10 includes a cooling pump 36 that pumps a cooling fluid through a coolant loop 38 outside of the stack and through the cooling fluid flow channels in the bipolar plates 14 and 18 within the fuel cell stack. A suitable manifold (not shown) would be provided to distribute the cooling fluid through the several flow channels in the plates 14 and 18 as is well understood in the art.

A portion of the cooling fluid in the loop 38 is directed to the heat exchanger 32 on the line 40 to cool the cathode input gas, as mentioned above. Therefore, the cathode input gas is maintained at the temperature of the stack once it reaches its operating temperature. The cooling fluid that flows through the heat exchanger 32 is recombined with the cooling fluid in the loop 38 at an output of the stack. A radiator (not shown) would typically be provided to cool the heated cooling fluid in the loop 38, so that the cooling fluid is maintained at the operating temperature of the stack. A controller 34 controls the operation of the pump 36 and the various other components in the system 10.

As is well understood in the art, fuel cells operate with a certain relative humidity based on the operating temperature of the fuel cell stack and the pressure within the stack to provide efficient stack operation. Also, the stack produces product water. Therefore, when the fuel cell stack is shut down, the MEAs 16 within the stack have a certain amount of moisture. If the fuel cell system 10 happens to be in a cold environment, this moisture can freeze, which may damage the MEAs 16. Therefore, it is known in the art to dry the fuel cell stack and membranes therein at system shutdown to prevent the stack from being damaged.

In one known technique, dry air is forced through the stack by the compressor 28 to provide stack drying. Most of the moisture is present on the cathode side of the MEAs 16 because of the product water, however there is some moisture on the anode side of the MEAs 16 because the MEA 16 is wet and moisture diffuses through the MEA 16 from the cathode side to the anode side. Therefore, stack drying techniques also direct the cathode air through the anode channels 22 for drying purposes, where suitable plumbing and control valves are provided to direct some of the compressed air on the line 30 into the anode channels 22.

When cold dry ambient air is introduced into the fuel cell stack after shutdown to dry the stack, it reduces the stack temperature at the inlet of the anode channels 22 and the cathode channels 24, which heats the air. In other words, if the temperature of the drying gas is less than the temperature of the fuel cell stack, the drying gas will remove heat from the fuel cell stack. The greatest and fastest cooling will occur at the flow field inlets. This heating of the cold dry gas entering the flow channels 22 and 24 causes condensation, represented as areas 46 and 48 in FIG. 1, at the input to the channel 22 and 24. This condensation acts to block the channels 22 and 24 or impede flow through the flow channels 22 and 24, reducing the ability of the air to dry the stack. In other words, the condensation increases the pressure resistance of the drying gas flow. Also, liquid water is more difficult to remove from the stack than water vapor.

SUMMARY OF THE INVENTION

In accordance with the teachings of the present invention, techniques are disclosed for drying a fuel cell stack in a fuel cell system after system shutdown. In one embodiment, the stack cooling fluid is pumped through the flow channels in the bipolar plates of the fuel cell stack after the system is shutdown to use the heat still available in the cooling fluid immediately after shutdown to provide a thermal equilibrium in the stack. In another embodiment, the heated cooling fluid still available immediately after system shutdown is sent through a cathode input gas heat exchanger so that drying air from the system compressor is heated by the cooling fluid before it enters the stack. In another embodiment, a separate heat exchanger, such as an electrical heater, is provided that receives the drying gas prior to it being sent into the fuel cell stack.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to various techniques for drying a fuel cell stack after system shutdown is merely exemplary in nature and is in no way intended to limit the invention or its applications or uses. For example, the processes for drying a fuel cell stack is discussed herein as having application for a fuel cell system on a vehicle. However, as will be appreciated by those skilled in the art, the processes of the invention have application for other fuel cells for other applications.

According to the invention, techniques are disclosed for either heating a gas, such as a cathode input gas, nitrogen, etc., used for drying the fuel cell stack after system shutdown or maintaining the fuel cell stack thermal equilibrium after system shutdown so as to prevent condensation from forming in the stack as a result of dry cold gas being used to dry the fuel cell stack. Further, a warm drying gas is able to remove more water vapor from the stack than a cool drying gas.

Figure 1:
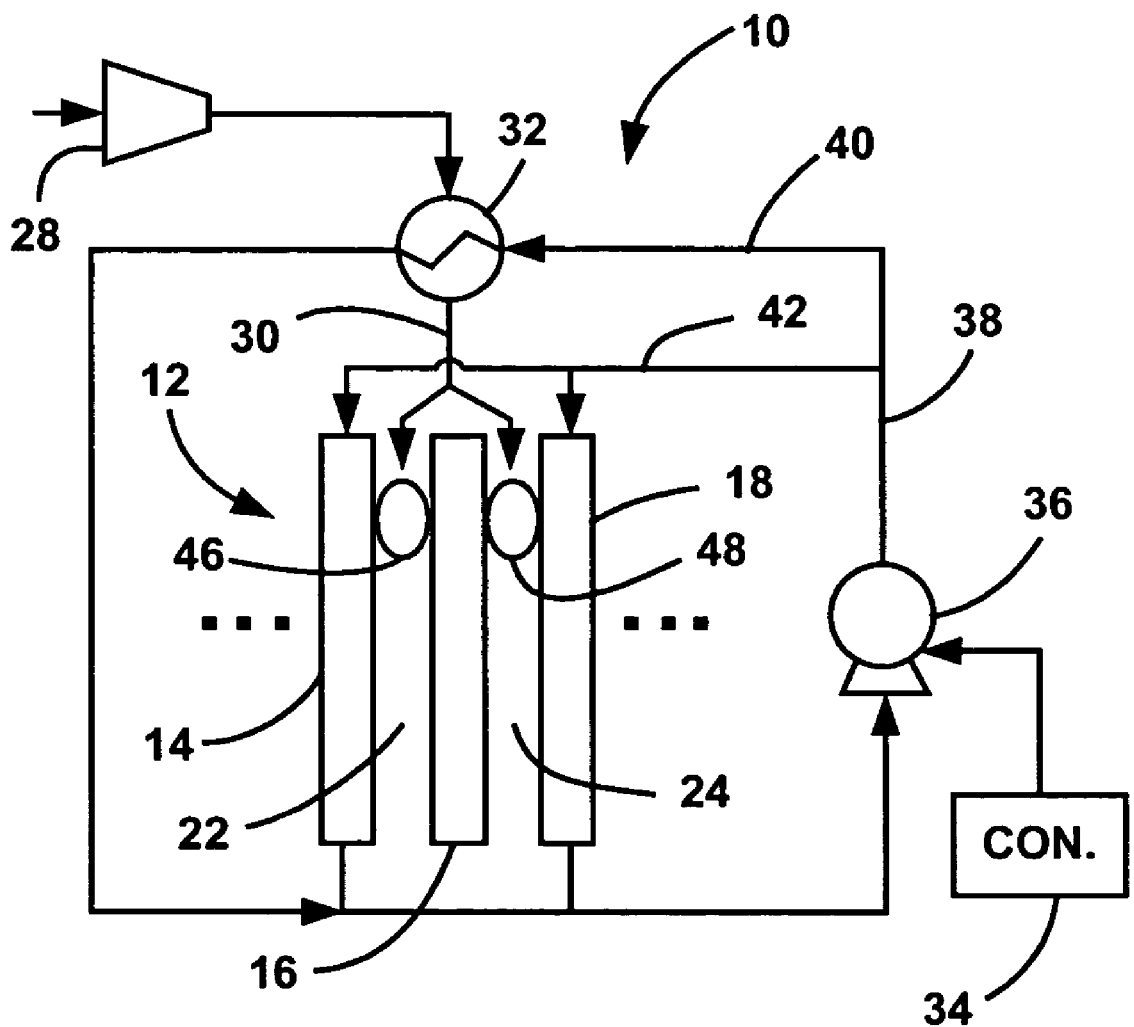
FIG. 1 is a schematic plan view of a fuel cell system including a cathode heat exchanger for heating a drying gas for drying a fuel cell stack in the system after system shutdown, according to one embodiment of the present invention.

Returning to FIG. 1, one embodiment of the present invention proposes using the pump 36 to pump the cooling fluid through the heat exchanger 32 on the line 40 after system shutdown so that it heats the drying gas from the compressor 28 prior to it being applied to the channels 22 and 24 to prevent localized cool spots at the inlet to the flow channels 22 and 24. Normally the pump 36 would be off after system shutdown. Because the operating temperature of the fuel cell stack is between 60°-80° C. during normal system operation, the cooling fluid within the coolant loop 38 retains much of this heat immediately after system shutdown, which can be used for the purposes described herein. Therefore, the temperature of the drying gas is higher than what would be able to cause condensation within the channels 22 and 24. The controller 34 receives the necessary input signals for operating the system 10 and controls the pump 36 at shutdown consistent with the discussion herein.

The pump 36 and the compressor 28 are operated by battery power after system shutdown. The compressor 28 is run at ambient pressure to conserve power. Further, the pump 36 can be run intermittently to maintain the thermal equilibrium in the stack to conserve power.

Figure 2:
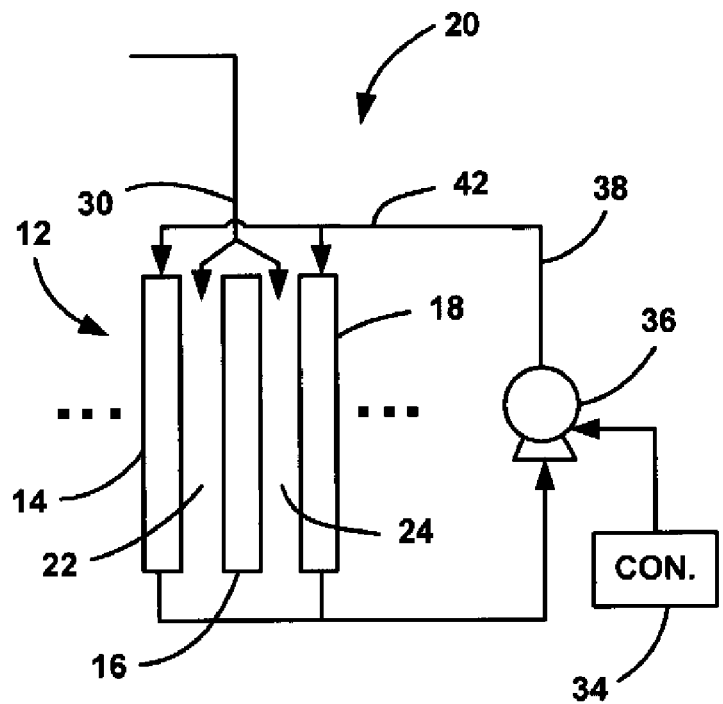
FIG. 2 is a schematic plan view of a fuel cell system that uses a cooling fluid flow for maintaining a fuel cell stack thermal equilibrium after system shutdown to prevent condensation, according to another embodiment of the present invention.

FIG. 2 is a simplified plan view of a fuel cell system 20 where like reference numerals identify like elements in the system 10. This embodiment of the present invention proposes using the pump 36 to pump the cooling fluid through the flow channels in the bipolar plates 14 and 18 after system shutdown, when normally the pump 36 would be off. The cooling fluid is directed through the bipolar plates 14 and 18 in the coolant loop 38 on a line 42. The cooling fluid flowing through the flow channels in the bipolar plates 14 and 18 provides a thermal equilibrium in the stack along the flow channels 22 and 24. The thermal equilibrium within the stack prevents localized cool spots at the inlet to the flow channels 22 and 24, and thus prevents the drying gas flowing through the channels 22 and 24 from condensing and forming water droplets therein.

Figure 3:
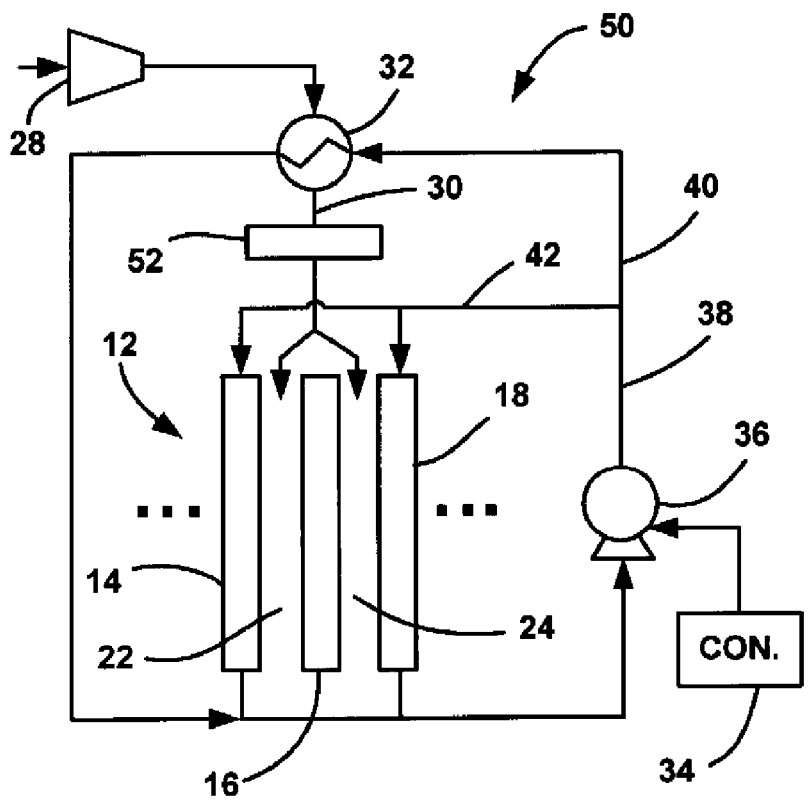
FIG. 3 is a schematic plan view of a fuel cell system including a heat exchanger for heating a drying gas for drying the fuel cell stack after system shutdown, according to another embodiment of the present invention.

FIG. 3 is a simplified plan view of a fuel cell system 50 employing a technique for heating a stack drying air for the reasons discussed above, where like reference numerals identify like elements in the system 10. The fuel cell system 50 includes a heat exchanger 52 positioned in the line 30 between the heat exchanger 32 and the fuel cell 12 for heating the drying gas on the line 30 after system shutdown. The heat exchanger 52 is an additional element to those fuel cell systems known in the art specifically for the purpose of heating the drying gas applied to the channels 22 and 24 to prevent condensation, as discussed above. The controller 34 would control the operation of the heat exchanger 52 after system shutdown. The heat exchanger 52 can be any heat exchanger suitable for the purposes described herein, such as an electrical heater or a combustor heat exchanger.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell stack including cathode flow channels and anode flow channels;
   a heat exchanger responsive to a drying gas for drying the fuel cell stack after system shutdown; and
   a controller for controlling the heat exchanger for heating the drying gas before it is sent to the fuel cell stack.

2. The system according to claim 1 wherein the heat exchanger cools a cathode input gas sent to the cathode flow channels when the fuel cell stack is providing output power.

3. The system according to claim 1 wherein the heat exchanger is selected from the group consisting of electrical heaters and combustor heat exchangers.

4. The system according to claim 1 further comprising a compressor, said compressor forcing the drying gas through the anode and cathode flow channels.

5. The system according to claim 1 wherein the stack includes an alternating series of membranes and bipolar plates, wherein the anode flow channels and the cathode flow channels are provided between the membranes and the bipolar plates.

6. The system according to claim 1 wherein the fuel cell system is on a vehicle.

7. A method for drying a fuel stack after stack shutdown, said method comprising operating a pump after the stack shutdown to flow a cooling fluid through flow channels in the stack after the stack is shutdown so as to provide a thermal equilibrium in the stack and prevent condensation in the stack.

8. The method according to claim 7 further comprising using an airflow forced through the flow channels by a compressor to dry the stack.

9. A method for drying a fuel stack after stack shutdown, said method comprising sending a stack drying gas through a heat exchanger to heat the drying gas prior to the drying gas being sent to the fuel cell stack for drying the fuel cell stack.

10. The method according to claim 9 wherein the heat exchanger cools a cathode input gas sent to cathode flow channels when the fuel cell stack is providing output power.

11. The method according to claim 9 wherein the drying gas is air forced through cathode flow channels by a compressor.

12. The method according to claim 9 wherein the heat exchanger is selected from the group consisting of electrical heaters and combustor heat exchangers.

* * * * *